(12) United States Patent
Ono

(10) Patent No.: US 11,460,617 B2
(45) Date of Patent: Oct. 4, 2022

(54) IMAGING APPARATUS AND IMAGE PROCESSING APPARATUS

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 355 days.

(21) Appl. No.: 16/840,444

(22) Filed: Apr. 5, 2020

(65) Prior Publication Data

US 2020/0233127 A1 Jul. 23, 2020

Related U.S. Application Data

(63) Continuation of application No. PCT/JP2018/037052, filed on Oct. 3, 2018.

(30) Foreign Application Priority Data

Oct. 11, 2017 (JP) .............................. JP2017-197860

(51) Int. Cl.
G02B 5/20 (2006.01)
H04N 5/225 (2006.01)
G02B 5/28 (2006.01)

(52) U.S. Cl.
CPC ............ *G02B 5/201* (2013.01); *G02B 5/285* (2013.01); *H04N 5/2253* (2013.01); *H04N 5/2254* (2013.01)

(58) Field of Classification Search
CPC .. H04N 5/2253; H04N 5/2254; H04N 5/2258; G02B 5/201; G02B 5/285;
(Continued)

(56) References Cited

U.S. PATENT DOCUMENTS 7,030,991 B1 * 4/2006 Kampe ................. G02B 23/00
356/450
8,823,858 B2 9/2014 Ono
(Continued)

FOREIGN PATENT DOCUMENTS

CN 103782586 5/2014
EP 2750374 7/2014
(Continued)

OTHER PUBLICATIONS

"Search Report of Europe Counterpart Application", dated Aug. 3, 2020, p. 1-p. 7, (Search report for EP 18865407.3).
(Continued)

*Primary Examiner* — Lin Ye
*Assistant Examiner* — Chriss S Yoder, III
(74) *Attorney, Agent, or Firm* — JCIPRNET

(57) ABSTRACT

Provided are an imaging apparatus capable of acquiring an image having a small transmission wavelength shift at a plurality of wavelengths and an image processing apparatus capable of measuring a subject on the basis of an image which has a small transmission wavelength shift and which is acquired at a plurality of wavelengths. High image height rays imaged at a position of which an image height is high is incident at a large angle with respect to the optical axis. Therefore, the transmission wavelength shift increases. However, in the imaging apparatus according to the first aspect, the first optical system causes the high image height rays to be incident into the first optical filter and the second optical filter in a state where the upper ray and the lower ray are parallel. Accordingly, in the first and second optical filters, the transmission wavelength shift due to an difference in incident angle of the high image height rays is suppressed, and an image with a small transmission wavelength shift can be acquired simultaneously at a plurality of wavelengths.

9 Claims, 14 Drawing Sheets

(58) Field of Classification Search
CPC .............. G02B 13/16; G01J 2003/1221; G01J 2003/123; G01J 2003/1239
See application file for complete search history.

(56) References Cited

U.S. PATENT DOCUMENTS

| | | | |
|---|---|---|---|
| 2009/0080090 A1 | 3/2009 | Maruyama | |
| 2014/0168498 A1* | 6/2014 | Ono | G03B 11/00 348/335 |
| 2015/0219494 A1 | 8/2015 | Hruska et al. | |
| 2015/0281535 A1* | 10/2015 | Korenaga | G02B 5/201 348/360 |
| 2016/0094822 A1* | 3/2016 | Imade | H04N 5/23212 348/336 |
| 2016/0255294 A1* | 9/2016 | Hiasa | H04N 5/23235 348/302 |
| 2021/0019899 A1* | 1/2021 | Ono | H04N 9/04557 |
| 2022/0078319 A1* | 3/2022 | Okada | G02B 5/3025 |

FOREIGN PATENT DOCUMENTS

| | | |
|---|---|---|
| JP | H07191310 | 7/1995 |
| JP | 2004163573 | 6/2004 |
| JP | 2006254135 | 9/2006 |
| JP | 2014206494 | 10/2014 |
| JP | 2015200640 | 11/2015 |

OTHER PUBLICATIONS

"International Search Report (Form PCT/ISA/210)" of PCT/JP2018/037052, dated Dec. 18, 2018, with English translation thereof, pp. 1-3.

"Written Opinion of the International Searching Authority (Form PCT/ISA/237)" of PCT/JP2018/037052, dated Dec. 18, 2018, with English translation thereof, pp. 1-7.

"Office Action of China Counterpart Application", dated Jan. 15, 2021, with English translation thereof, p. 1-p. 11, (Office action for Chinese Application No. 201880062838.X).

* cited by examiner

EFL = 14.062

WAVELENGTHS [nm]
690.00    720.00    660.00

SURFACES

| # | SURF SPACE | RADIUS | SEPN | INDEX1 | V | CLR RAD | GLASS |
|---|---|---|---|---|---|---|---|
| 0 | S | | 0.00000 | 1.000000 | | | |
| 1 | S | -127.27679 | 1.78428 | 1.900327 | | 9.600 | H-TAFD35 |
| 2 | S | 22.17038 | 5.29685 | 1.000000 | | 8.905 | |
| 3 | S | -104.42763 | 7.00000 | 1.938062 | | 9.086 | O-S-NPH3 |
| 4 | S | -24.19469 | 1.47927 | 1.000000 | | 9.486 | |
| 5 | S | Plane | 5.00000 | 1.513330 | | 8.512 | H-BSC7 |
| 6 | S | Plane | 2.00000 | 1.000000 | | 7.591 | |
| 7#S | | Plane | 2.78512 | 1.000000 | | 7.621 | |
| 8 | S | -17.99767 | 10.10569 | 1.938062 | | 7.898 | O-S-NPH3 |
| 9 | S | 45.45846 | 8.84338 | 1.824824 | | 13.206 | O-S-LAH60 |
| 10 | S | -25.49641 | 0.00557 | 1.000000 | | 14.299 | |
| 11 | S | 35.77812 | 9.00000 | 1.904798 | | 16.531 | O-S-LAH88 |
| 12 | S | 147.96606 | 21.39388 | 1.000000 | | 15.841 | |
| 13 | S | 49.81056 | 7.00000 | 1.874073 | | 12.963 | O-S-LAH58 |
| 14 | S | -153.85354 | 0.04269 | 1.000000 | | 12.030 | |
| 15 | S | 20.90484 | 6.93261 | 1.559878 | | 10.453 | O-S-BAL41 |
| 16 | S | -21.63475 | 1.99474 | 1.904037 | | 9.452 | O-S-NPH2 |
| 17 | S | 40.27819 | 0.81988 | 1.000000 | | 8.111 | |
| 18 | S | Plane | 2.00000 | 1.000000 | | 8.113 | |
| 19 | S | Plane | 0.50000 | 1.502343 | | 7.459 | U-OK1 |
| 20 | S | Plane | 4.99412 | 1.000000 | | 7.354 | |
| 21 | S | Plane | | | | 5.800 | |

FIG. 6A

......... HIGH IMAGE HEIGHT RAYS TRANSMITTING FIRST OPTICAL FILTER 53A (IMAGE HEIGHT OF 70%)

——— CENTRAL RAYS TRANSMITTING FIRST OPTICAL FILTER 53A

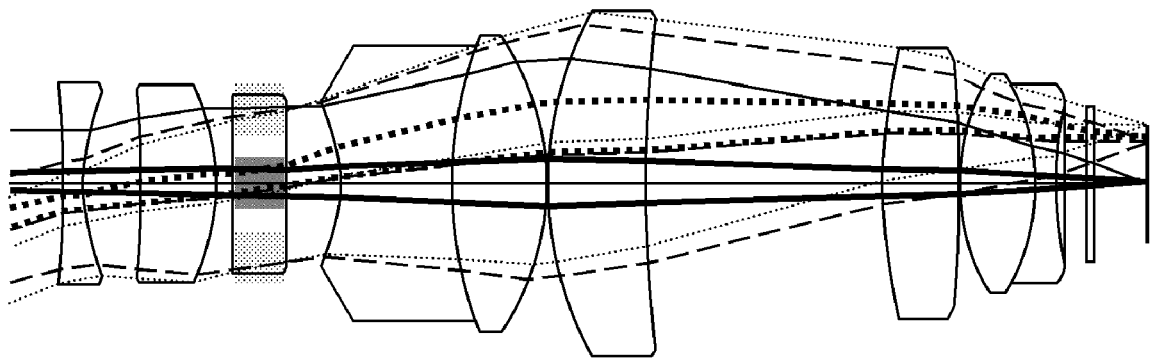

FIG. 6B

– – – HIGH IMAGE HEIGHT RAYS TRANSMITTING SECOND OPTICAL FILTER 53B (IMAGE HEIGHT OF 70%; UPPER RAY)

......... HIGH IMAGE HEIGHT RAYS TRANSMITTING SECOND OPTICAL FILTER 53B (IMAGE HEIGHT OF 70%; LOWER RAY)

——— CENTRAL RAYS TRANSMITTING SECOND OPTICAL FILTER 53B (VERTICAL SYMMETRY)

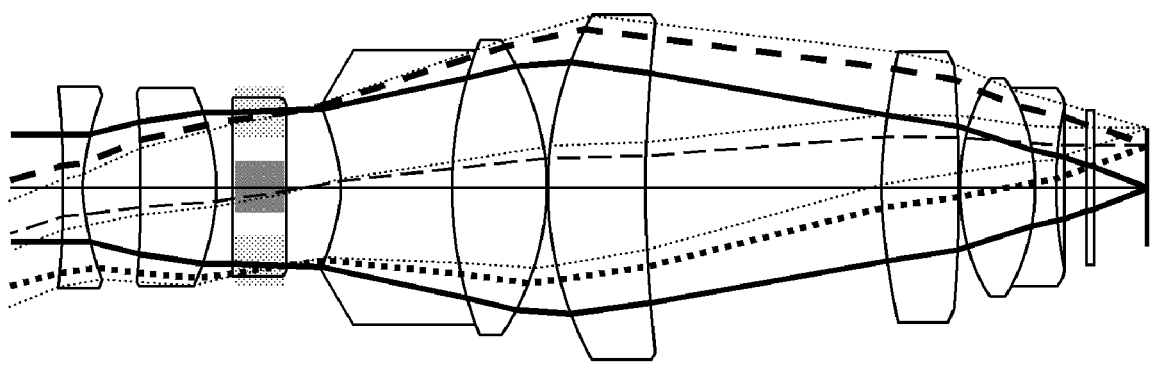

FIG. 7A

........ HIGH IMAGE HEIGHT RAYS TRANSMITTING FIRST OPTICAL FILTER 63A (IMAGE HEIGHT OF 70%)
—— CENTRAL RAYS TRANSMITTING FIRST OPTICAL FILTER 63A

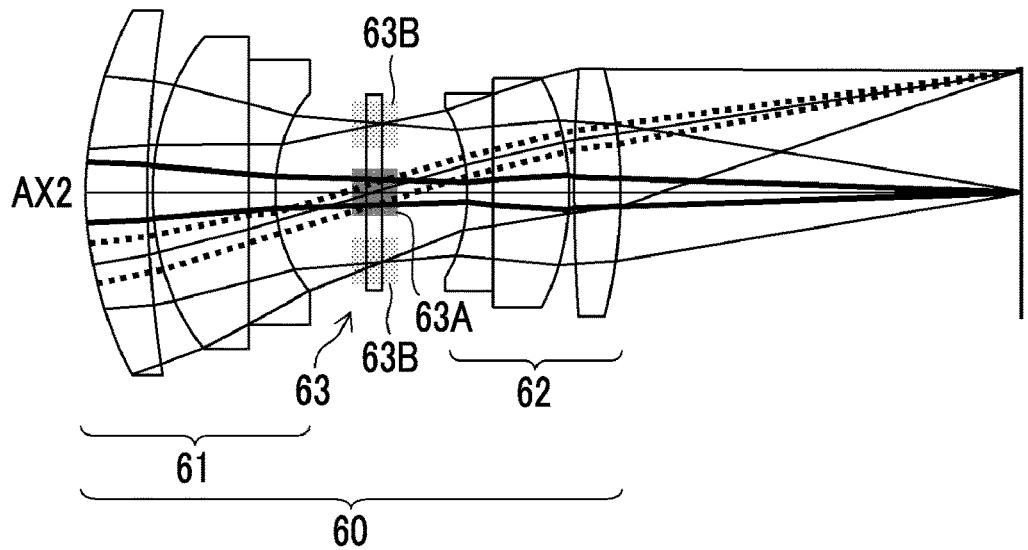

FIG. 7B

— — — HIGH IMAGE HEIGHT RAYS TRANSMITTING SECOND OPTICAL FILTER 63B (IMAGE HEIGHT OF 70%; UPPER RAY)
........ HIGH IMAGE HEIGHT RAYS TRANSMITTING SECOND OPTICAL FILTER 63B (IMAGE HEIGHT OF 70%; LOWER RAY)
—— CENTRAL RAYS TRANSMITTING SECOND OPTICAL FILTER 63B (VERTICAL SYMMETRY)

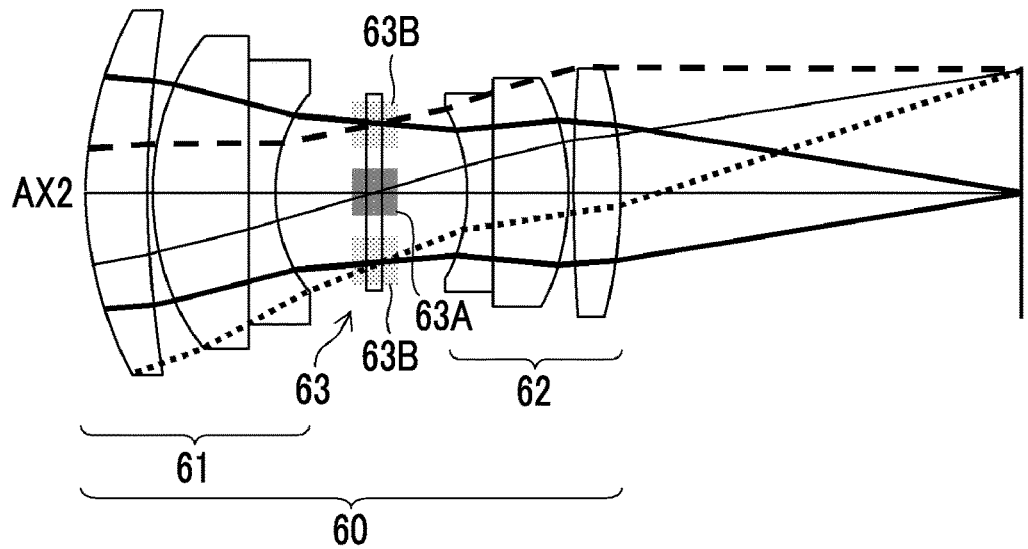

FIG. 8A

| | COMPARATIVE EXAMPLE | | | | EXAMPLE | | | |
|---|---|---|---|---|---|---|---|---|
| | INCIDENT ANGLE TO SECOND OPTICAL FILTER (deg) | | INCIDENT ANGLE TO FIRST OPTICAL FILTER (deg) | | INCIDENT ANGLE TO SECOND OPTICAL FILTER (deg) | | INCIDENT ANGLE TO FIRST OPTICAL FILTER (deg) | |
| | HIGH IMAGE HEIGHT RAYS | CENTRAL RAYS | HIGH IMAGE HEIGHT RAYS | CENTRAL RAYS | HIGH IMAGE HEIGHT RAYS | CENTRAL RAYS | HIGH IMAGE HEIGHT RAYS | CENTRAL RAYS |
| UPPER RAY | 12.3 | 5.12 | 16.8 | 0.0 | 12.02 | 1.0 | 11.04 | 0.0 |
| LOWER RAY | 22.1 | 5.12 | 16.8 | 0.0 | 10.44 | 1.0 | 11.04 | 0.0 |

FIG. 8B

| | COMPARATIVE EXAMPLE | | | | EXAMPLE | | | |
|---|---|---|---|---|---|---|---|---|
| | INCIDENT ANGLE TO SECOND OPTICAL FILTER (nm) | | INCIDENT ANGLE TO FIRST OPTICAL FILTER (nm) | | INCIDENT ANGLE TO SECOND OPTICAL FILTER (nm) | | INCIDENT ANGLE TO FIRST OPTICAL FILTER (nm) | |
| | HIGH IMAGE HEIGHT RAYS | CENTRAL RAYS | HIGH IMAGE HEIGHT RAYS | CENTRAL RAYS | HIGH IMAGE HEIGHT RAYS | CENTRAL RAYS | HIGH IMAGE HEIGHT RAYS | CENTRAL RAYS |
| UPPER RAY | 701.2 | 708.5 | 650.9 | 670.0 | 701.6 | 709.9 | 661.8 | 670.0 |
| LOWER RAY | 682.3 | 708.5 | 650.9 | 670.0 | 703.7 | 709.9 | 661.8 | 670.0 |

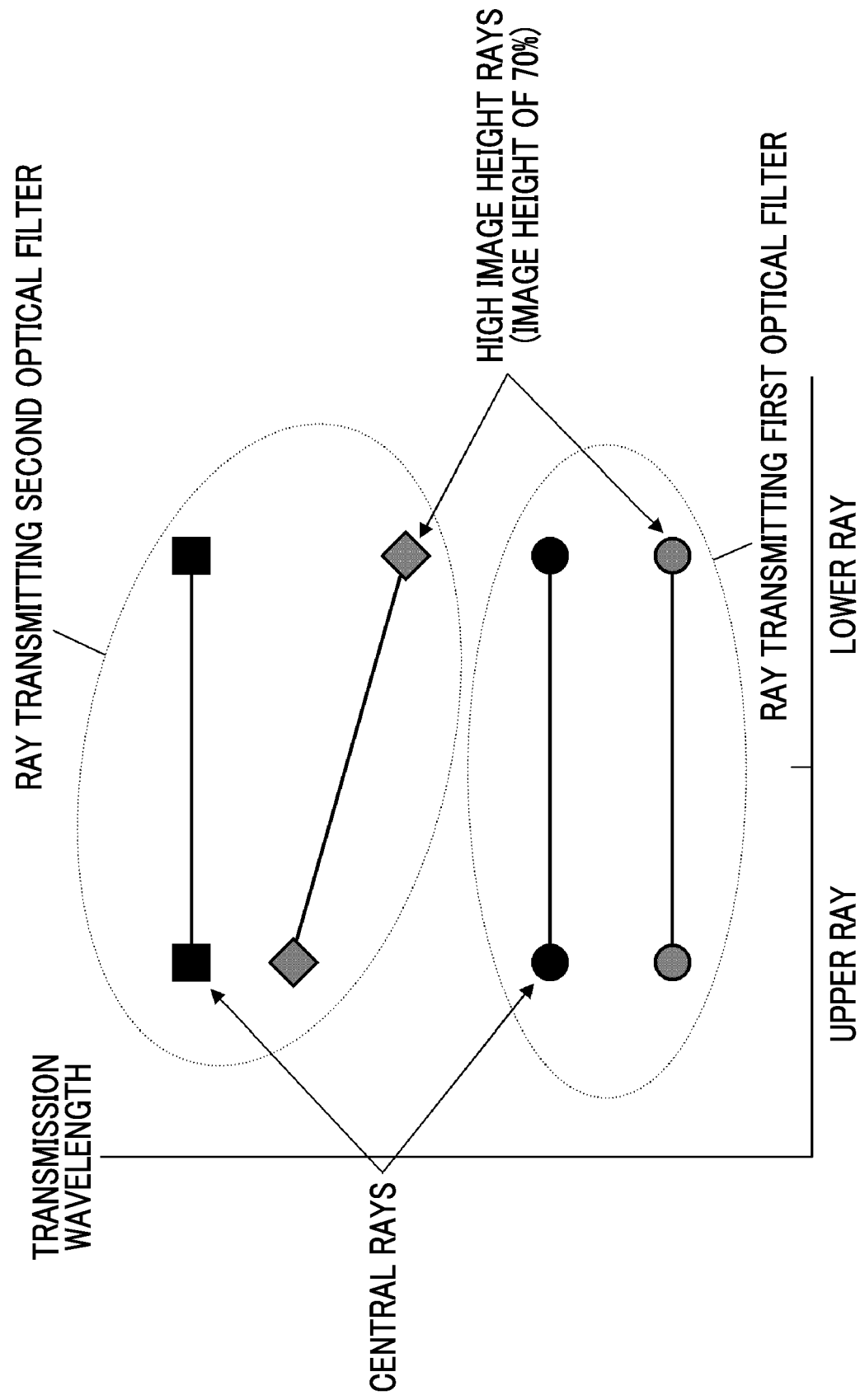

FIG. 11

| | COMPARATIVE EXAMPLE | | | | EXAMPLE | | | |
|---|---|---|---|---|---|---|---|---|
| | TRANSMISSION WAVELENGTH OF SECOND OPTICAL FILTER (nm) | | TRANSMISSION WAVELENGTH OF FIRST OPTICAL FILTER (nm) | | TRANSMISSION WAVELENGTH OF SECOND OPTICAL FILTER (nm) | | TRANSMISSION WAVELENGTH OF FIRST OPTICAL FILTER (nm) | |
| | HIGH IMAGE HEIGHT RAYS | CENTRAL RAYS | HIGH IMAGE HEIGHT RAYS | CENTRAL RAYS | HIGH IMAGE HEIGHT RAYS | CENTRAL RAYS | HIGH IMAGE HEIGHT RAYS | CENTRAL RAYS |
| UPPER RAY | 1675.1 | 1692.3 | 1385.4 | 1426.0 | 1676.0 | 1695.9 | 1408.3 | 1426.0 |
| LOWER RAY | 1629.8 | 1692.3 | 1385.4 | 1426.0 | 1680.9 | 1695.9 | 1408.3 | 1426.0 |

IMAGING APPARATUS AND IMAGE PROCESSING APPARATUS

CROSS-REFERENCE TO RELATED APPLICATIONS

The present application is a Continuation of PCT International Application No. PCT/JP2018/037052 filed on Oct. 3, 2018 claiming priority under 35 U.S.C § 119(a) to Japanese Patent Application No. 2017-197860 filed on Oct. 11 2017. Each of the above applications is hereby expressly incorporated by reference, in its entirety, into the present application.

BACKGROUND OF THE INVENTION

1. Field of the Invention

The present invention relates to an imaging apparatus that acquires an image at a specific wavelength and an image processing apparatus that measures a subject on the basis of the acquired image.

2. Description of the Related Art

In the field of imaging apparatuses, a technique of acquiring an image at a specific wavelength is known. In such an imaging apparatus, an optical filter that transmits a specific wavelength is used to acquire a desired image. However, in a case where such an optical filter is used, the incident angle of the ray greatly differs in accordance with the region of the optical filter (for example, the center and the periphery of the angle of view). As a result, the transmission wavelength may be shifted. For this reason, a technique of suppressing a shift in transmission wavelength due to a difference in incident angle is known. For example, JP2006-254135A is to suppress a change in transmission characteristics in accordance with a region by using an optical filter that is curved such that an incident angle of light is smaller than that in a case of a flat surface.

SUMMARY OF INVENTION

However, in JP2006-254135A described above, since the optical filter is curved, the processing therefor is troublesome. In particular, this problem becomes remarkable in a case of acquiring images at a plurality of wavelengths. Specifically, in the technique of JP2006-254135A, it is necessary to provide a plurality of optical filters having different degrees of curvature corresponding to the respective wavelengths, which gives trouble in the processing and complicates the configuration of the optical system.

As described above, in the related art, it is difficult to acquire an image at a plurality of wavelengths (particularly, a plurality of narrow-band wavelengths) and to measure a subject on the basis of the acquired image.

The present invention has been made in view of such circumstances, and its object is to provide an imaging apparatus capable of acquiring an image having a small transmission wavelength shift at a plurality of wavelengths and an image processing apparatus capable of accurately measuring a subject on the basis of an image which has a small transmission wavelength shift and which is acquired at a plurality of wavelengths.

In order to achieve the above-mentioned object, an imaging apparatus according to a first aspect of the present invention comprises: an imaging optical system in which a first optical system, an optical filter composed of a first optical filter and a second optical filter where the first optical filter transmits light in a first wavelength band and the second optical filter transmits light in a second wavelength band different from the first wavelength band, and a second optical system are arranged in order from the subject side; a directional sensor that has a plurality of pixels composed of two-dimensionally arranged photoelectric conversion elements, where the directional sensor pupil-divides each of rays incident through the optical filter and receives the rays selectively; and an image acquisition unit that acquires, from the directional sensor, each of a first image received through the first optical filter and a second image received through the second optical filter. The first optical filter and the second optical filter are arranged in different regions in a plane perpendicular to an optical axis of the imaging optical system at a position of an entrance pupil of the imaging optical system, respectively. The first optical system causes high image height rays imaged at a position at which an image height is high on an imaging surface of the directional sensor to be incident into the first optical filter and the second optical filter in a state where an upper ray and a lower ray of the high image height rays are parallel.

The high image height rays imaged at a position of which the image height is high is incident at a large angle with respect to the optical axis. Therefore, the transmission wavelength shift increases. However, in the imaging apparatus according to the first aspect, the first optical system causes the high image height ray to be incident into the first optical filter and the second optical filter in a state where the upper ray and the lower ray are parallel. Therefore, in the first and second optical filters, the transmission wavelength shift due to the difference in incident angle of the high image height ray is suppressed. Thus, an image with a small transmission wavelength shift can be acquired at a plurality of wavelengths. Further, in the first aspect, the transmitted light of the optical filters having different transmission wavelength bands is pupil-divided and received by the directional sensor. Therefore, a plurality of images having different wavelengths can be acquired at the same time.

In the first embodiment, the upper ray and the lower ray are parallel. The term "parallel" does not necessarily mean completely parallel, and there may be a difference in angle within a range where the effect of the shift of the transmission wavelength is allowable. The term "position of which the image height is high" may be, for example, a position where the image height is 70%, but may be defined by another image height (80%, 100%, or the like).

In the imaging apparatus according to a second aspect, in the first aspect, the first optical filter is disposed in a first region centered on the optical axis, the second optical filter is disposed in a second region outside the first region, and the first optical system causes the high image height rays to be incident into the second optical filter in a state where the upper ray and the lower ray of the high image height rays are parallel. In a case where the first optical filter is disposed in a region centered on the optical axis and the second optical filter is disposed in a region outside the first optical filter, an effect (the amount and difference of the transmission wavelength shift) due to the difference in incident angle between the upper ray and the lower ray of the high image height rays incident into the second optical filter increases. Therefore, as in the second aspect, the first optical system causes the high image height rays to be incident into the second optical filter in a state where the upper ray and the lower ray of the high image height rays are parallel. This configuration is effective for suppressing the wavelength shift.

In the imaging apparatus according to a third aspect, in the second aspect, the first optical system causes the high image height rays and central rays imaged at a center of the imaging surface to be incident into the second optical filter in a state where an angle formed between the upper ray of the high image height rays and the upper ray of the central rays is equal to or less than a first threshold value and an angle formed between the lower ray of the high image height rays and a lower ray of the central rays is equal to or less than a second threshold value. As described above with respect to the second aspect, the effect (the amount and difference of the transmission wavelength shift) due to the difference in incident angle between the upper ray and the lower ray of the high image height rays incident into the second optical filter increases. For this reason, in the third aspect, the effect of the difference in incident angle is suppressed by defining the angle formed between the rays incident into the second optical filter. It should be noted that the first and second threshold values can be set in accordance with the allowable transmission wavelength shift.

In the imaging apparatus according to a fourth aspect, in the second or third aspect, the first optical system causes the high image height rays and central rays imaged at a center of the imaging surface to be incident into the first optical filter in a state where an angle formed between the upper ray of the high image height rays and an upper ray of the central rays is equal to or less than a third threshold value and an angle formed between the lower ray of the high image height rays and a lower ray of the central rays is equal to or less than a fourth threshold value. According to the fourth aspect, by defining the angle formed between the rays incident into the first optical filter, it is possible to suppress the effect of the difference in incident angle. It should be noted that the third and fourth threshold values can be set in accordance with the allowable transmission wavelength shift.

In the imaging apparatus according to a fifth aspect, in any one of the first to fourth aspects, the first optical system constitutes an afocal optical system. The afocal optical system is a non-focal optical system in which parallel rays are incident into a lens and the parallel rays are emitted in a similar manner. In the fifth aspect, the first optical system disposed to be closer to the subject side than the optical filter is an afocal optical system. Therefore, parallel rays are emitted from the first optical system, and the upper ray, and the lower ray of the high image height rays are incident into the optical filter in parallel. Thus, the difference in transmission wavelength shift is reduced. In the fifth aspect, the configuration of the first optical system may be different from that of the afocal optical system within the range in which the effect of the transmission angle and the transmission wavelength shift caused by the transmission angle is allowable.

In the imaging apparatus according to a sixth aspect, in the fifth aspect, an afocal magnification of the afocal optical system is less than 1. The afocal magnification is a numerical value that is represented by a ratio of pupil diameters of parallel rays incident into the afocal optical system and parallel rays emitted therefrom. In the sixth aspect, since the afocal magnification is less than 1, the diameter of the emitted rays is greater than the diameter of the incident rays.

In the imaging apparatus according to the seventh aspect, in any one of the first to sixth aspects, the directional sensor has a light blocking mask or a micro lens array that functions as a pupil division unit. The seventh aspect shows one aspect of a specific configuration for selective light reception.

In the imaging apparatus according to an eighth aspect, in any one of the first to seventh aspects, the first optical filter and the second optical filter transmit light having wavelength bands, which do not overlap each other in a wavelength band of 650 nm or more and 740 nm or less, as light having the first wavelength band and light having the second wavelength band, respectively. According to the eighth aspect, an image can be acquired at two wavelengths in the visible red wavelength band.

In order to achieve the above object, an image processing apparatus according to a ninth aspect of the present invention comprises: the imaging apparatus according to any one of the first to eighth aspects; and a measurement unit that measures a subject from the first image and. the second image. According to the ninth aspect, the first and second images acquired by the imaging apparatus according to any one of the first to ninth aspects are used. Therefore, on the basis of an image which has a small transmission wavelength shift and which is acquired at a plurality of wavelengths, measurement of the subject can be accurately performed.

As described above, according to the imaging apparatus of the present invention, an image having a small transmission wavelength shift can be acquired at a plurality of wavelengths. According to the image processing apparatus of the present invention, on the basis of an image which is acquired at a plurality of wavelengths and has a small transmission wavelength shift, measurement of the subject can be accurately performed.

BRIEF DESCRIPTION OF THE DRAWINGS

FIG. 2 is a diagram showing lens arrangement of the imaging optical system.

FIG. 3 is a diagram showing lens data of the imaging optical system.

FIGS. 6A and 6B are diagrams showing light transmission in an example.

FIGS. 7A and 7B are diagrams showing states of light transmission in a comparative example.

FIGS. 8A and 8B are tables showing incident angles and transmission wavelengths in the example and the comparative example.

FIG. 10 is a diagram schematically showing a relationship between transmission wavelengths.

FIG. 11 is another table showing incident angles and transmission wavelengths in the example and the comparative example.

DESCRIPTION OF THE PREFERRED EMBODIMENTS

Hereinafter, embodiments of an imaging apparatus and an image processing apparatus according to the present invention will be described in detail with reference to the accompanying drawings.

First Embodiment

<Overall Configuration of Image Processing Apparatus>

Figure 1:
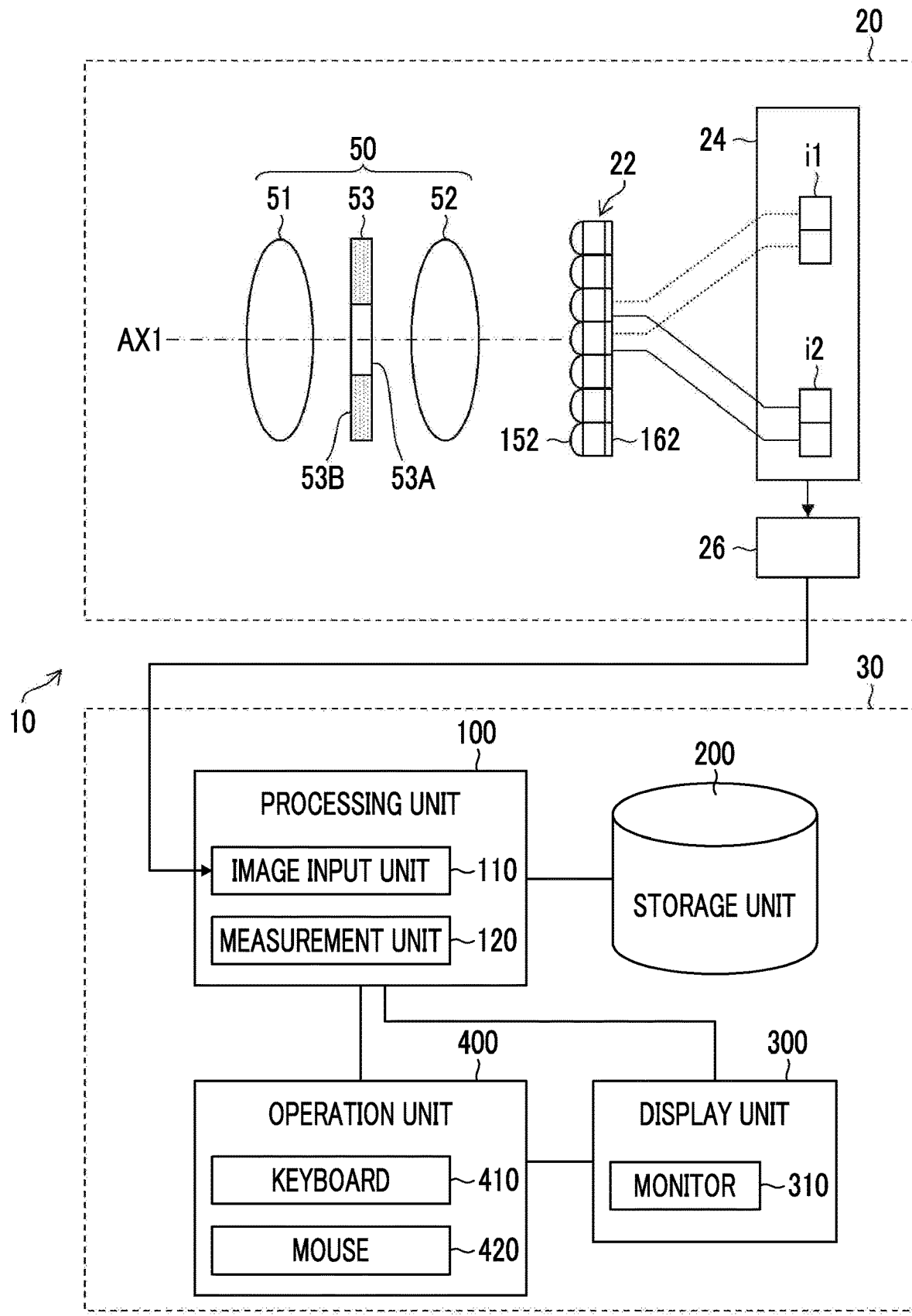
FIG. 1 is a diagram showing a configuration of an image processing apparatus according to a first embodiment.

FIG. 1 is a diagram showing a configuration of an image processing apparatus 10 (image processing apparatus) according to a first embodiment. As shown in FIG. 1, the image processing apparatus 10 comprises an imaging apparatus 20 (imaging apparatus) and an analysis device 30 (measurement unit). An image acquired by the imaging apparatus 20 is input to the analysis device 30, and the analysis device 30 measures the subject. The imaging apparatus 20 and the analysis device 30 may be housed in one case or may be housed in separate cases.

<Configuration of Imaging Apparatus>

The imaging apparatus 20 comprises an imaging optical system 50 (imaging optical system), a light receiving unit 22. (directional sensor), an image acquisition unit 24 (image acquisition unit), and an image recording unit 26, and has a function of receiving light having different wavelengths and capturing a plurality of images. In FIG. 1, the configuration (number of lenses, shape, arrangement, and the like) of the imaging optical system 50 is simplified. The detailed configuration will be described below.

<Configuration of Imaging Optical System>

Figure 2:
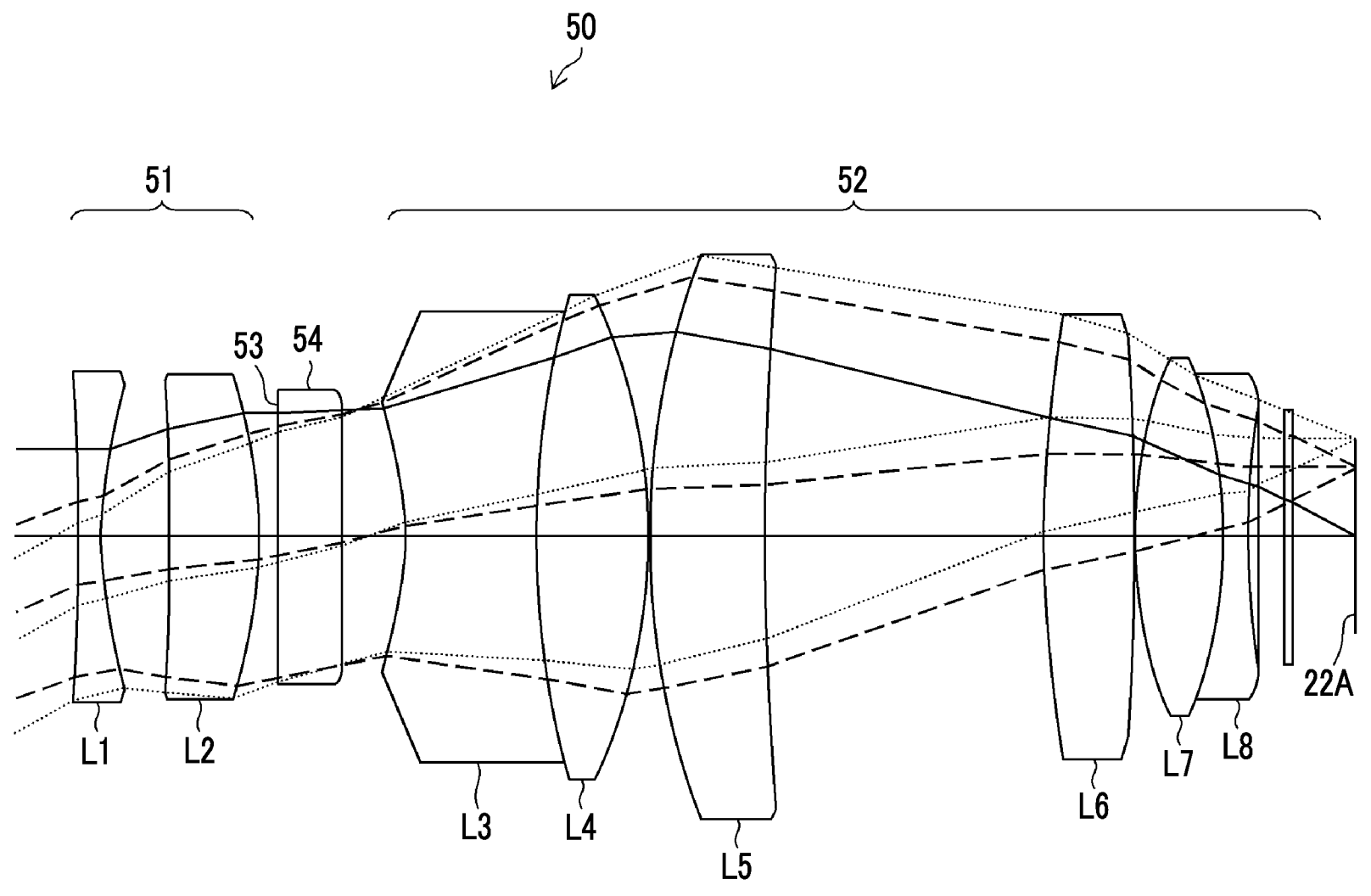

In the imaging optical system 50, a first optical system 51, an optical filter 53, and a second optical system 52 are arranged around a common optical axis AX1 as a center in order from the subject side. Thus, the optical filter 53 (optical filter) provides a different transmission wavelength characteristic for each light transmitting region. FIG. 2 is a diagram showing the lens arrangement of the imaging optical system 50. The first optical system 51 is an afocal optical system composed of lenses L1 and L2. The second optical system 52 is composed of lenses L3 to L8, and forms an image of rays, which are transmitted through the first optical system 51 and the optical filter 53, on the imaging surface 22A of the light receiving unit 22. The optical filter 53 is disposed on the front surface (subject side) of the at plate 54 at the position of the entrance pupil of the imaging optical system 50.

<Configuration of First Optical System>

In the imaging apparatus 20 according to the first embodiment, the optical filter 53 is disposed at the position of the entrance pupil of the imaging optical system 50, and light transmitted through the first optical system 51 is incident into the optical filter 53. In order to suppress the transmission wavelength shift in the optical filter 53, in a case of considering the infinity magnification of the image capturing, it is desirable that, first, on-axis rays in the stop space, that is, at the position of the entrance pupil where the optical filter 53 is disposed, are as parallel to the optical axis as possible. Therefore, it is desirable that the first optical system 51 forms an afocal optical system (the fidelity with respect to the afocal optical system may be considered in the allowable range of the angle between the optical axis and the ray). Further, it is desirable that the off-axis rays are as parallel to the optical axis as possible.

That is, it is desirable that the off-axis rays have an angle that is considerably smaller than the incident angle in the stop space (at the position of the entrance pupil) of the imaging optical system 50. Therefore, under the premise that the afocal optical system is established, it is necessary that the afocal magnification Y<1. Y is a value obtained by dividing the thickness of the incident rays in the afocal optical system by the thickness of the emitted rays, and is also an angular magnification and a difference between the angles at the time of incidence and the time of emission of afocal off-axis light. As shown in FIGS. 6A and 6B and the like, in the imaging apparatus 20 according to the first embodiment, the on-axis rays are thick in the stop space (pupil position) (that is, the afocal magnification is less than 1). It should be noted that the focal length of the entire imaging optical system 50 is obtained by multiplying the afocal magnification by the focal length of the optical system after the stop (on the imaging element side from the entrance pupil position).

Therefore, in a case where an optical filter is disposed in the stop space (at the position of the entrance pupil) of the imaging optical system 50, in order to widen the imaging angle of view, it is necessary that an afocal system (or an optical system functioning as an afocal system within a range where the transmission angle and/or the transmission wavelength shift is allowable) of which an afocal magnification (angular magnification) is less than 1 is configured as an optical system ahead of the stop (entrance pupil). FIG. 3 is a diagram showing lens data of the imaging optical system 50. A portion surrounded by the rectangle indicates a surface on which the optical filter 53 is disposed. The afocal magnification (angular magnification) of the first optical system 51 is 0.668.

<Configuration of Optical Filter>

Figure 4:
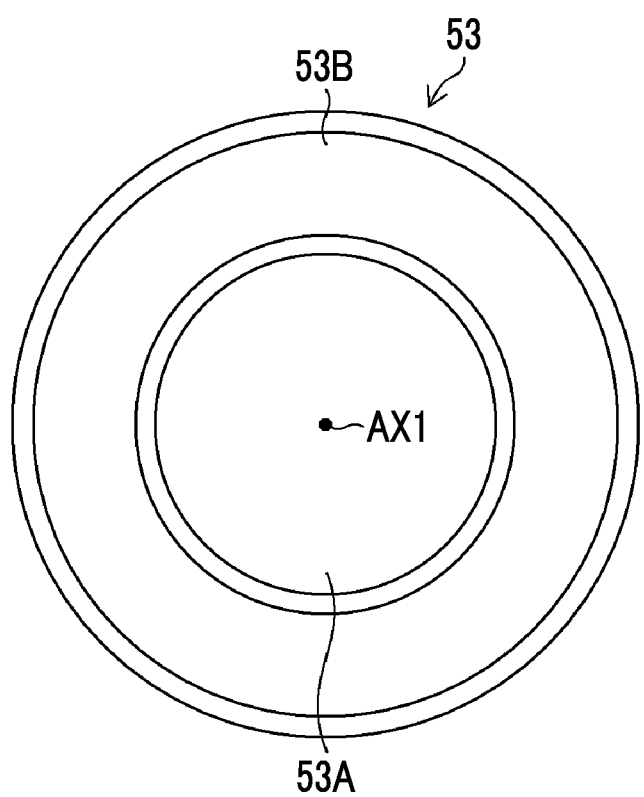
FIG. 4 is a diagram showing arrangement of optical filters.

The optical filter 53 is composed of a first optical filter 53A (first optical filter) and a second optical filter 53B (second optical filter). The optical filters are respectively disposed in different regions in the plane (the front surface of the flat plate 54) which is perpendicular to the optical axis AX1 at the pupil position of the imaging optical system 50 (refer to FIG. 2). As shown in FIG. 4, the first optical filter 53A is disposed in a circular region (first region) centered on the optical axis AX1, and the second optical filter 53B is disposed in an annular region (a second region) around (outside) the first region. The first optical filter 53A and the second optical filter 53B can be formed by a dielectric multilayer film.

Through such an optical filter 53, in the subject light passing through the imaging optical system 50, light passing through the first optical filter 53A (first pupil region) becomes light having a first wavelength band, and light passing through the second optical filter 53B (second pupil region) becomes light having a second wavelength band. Specific values of the transmission wavelengths of the first optical filter 53A and the second optical filter 53B will be described with reference to examples described later.

<Configuration of Light Receiving Unit>

The subject light passing through the imaging optical system 50 is incident into the light receiving unit 22. The light receiving unit 22 has a plurality of pixels composed of photoelectric conversion elements two-dimensionally arranged, and selectively receives light by respectively pupil-dividing rays incident through the first optical filter 53A and the second optical filter 53B. Further, one micro lens 152 is provided for one light-receiving element. The micro lenses 152 are regularly arranged in a plane perpendicular to the optical axis AX1, and a light-receiving element 162 is disposed on each micro lens 152. As the light-receiving element 162, a metal oxide semiconductor (MOS)

or a complementary metal oxide semiconductor (CMOS) imaging element is used. As the light-receiving element 162, in addition, a solid-state imaging element such as a charge coupled device (CCD) type imaging element may be used.

Figure 5:
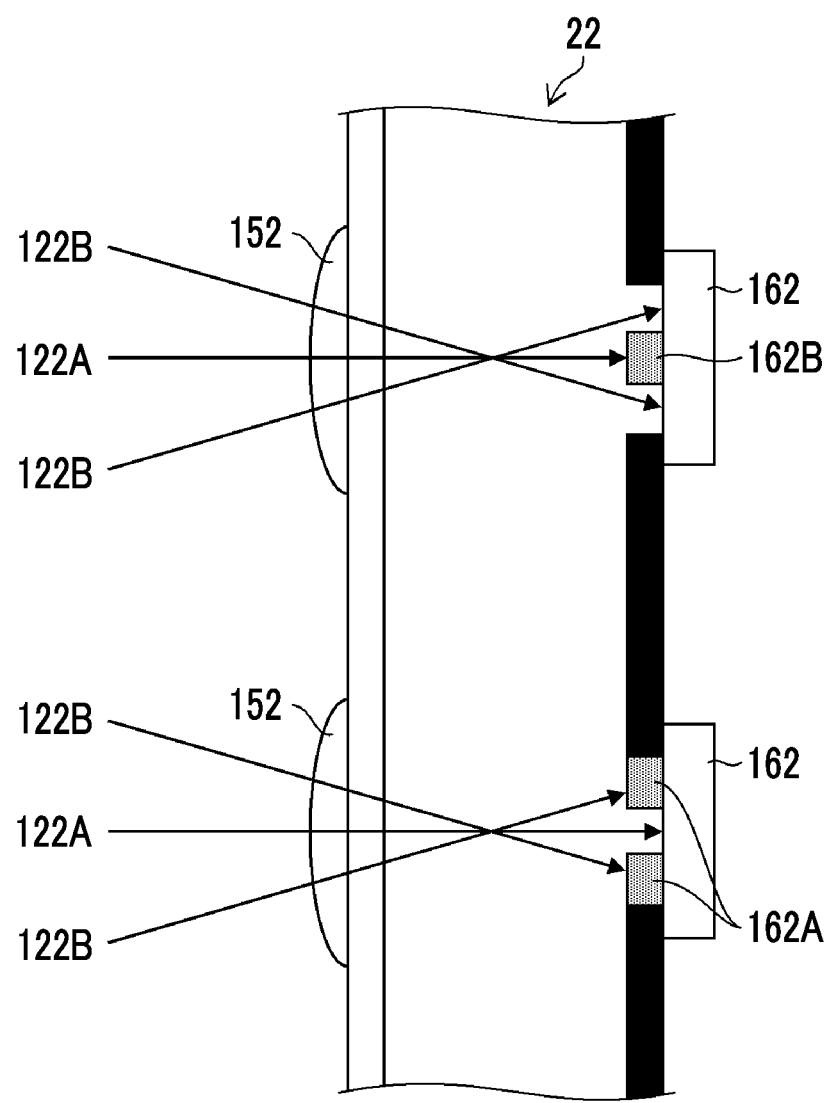
FIG. 5 is a diagram showing a state of selective light reception by the light blocking mask.

FIG. 5 is a cross-sectional view of the light receiving unit 22 on a plane including the optical axis AXI FIG. 5, rays 122A and 122B schematically show rays passing through the first optical filter 53A and the second optical filter 53B, respectively. A light blocking mask 162A (pupil division unit) or a light blocking mask 162B (pupil division unit) is disposed on the light receiving surface of the light-receiving element 162 in accordance with the arrangement of the optical filters. An annular light blocking mask 162A corresponding to the first optical filter 53A (circular) blocks the ray 12213, and a circular light blocking mask 16213 corresponding to the second optical filter 53B (annular) blocks the ray 122A. Thus, the light-receiving element 162 receives the rays 122A and 122B separately. The light receiving unit 22 supplies signals based on the separately received rays as an image signals to the image acquisition unit 24.

<Configuration of Image Acquisition Unit and Image Recording Unit>

The image acquisition unit 24 acquires an image i1 (first image) received through the first optical filter 53A and an image i2 (second image) received through the second optical filter 53B. That is, the image acquisition unit 24 acquires two images having different wavelengths from the image signal. The image recording unit 26 records the images i1 and i2 acquired by the image acquisition unit 24. The image recording unit 26 may record an image in a nonvolatile memory. The image recording unit 26 may have a nonvolatile memory. Further, the nonvolatile memory may be an external memory detachably provided in the imaging apparatus 20. The image recording unit 26 is able to output an image to the outside of the imaging apparatus 20 (for example, the analysis device 30).

<Configuration of Analysis Device>

The analysis device 30 comprises a processing unit 100 (measurement unit), a storage unit 200, a display unit 300, and an operation unit 400, and the units are connected to each other so as to transmit and receive necessary information. These components can be arranged in various forms. Each component may be disposed at one place (in one housing, in one room, or the like), or may be disposed at a separated place and may be connected through a network.

<Configuration of Processing Unit>

The processing unit 100 comprises an image input unit 110 and a measurement unit 120 (measurement unit). The image input unit 110 is composed of a recording medium interface which is not shown, a control circuit thereof, a communication control unit that controls communication (wireless or wired) with the imaging apparatus 20, and the like, and inputs an image, which is acquired by the imaging apparatus 20, thereto. The measurement unit 120 measures the subject on the basis of the image which is input by the image input unit 110 (described later).

The functions of the control circuit, the communication control unit, and the measurement unit 120 described above can be implemented using various processors. The various processors include, for example, a central processing unit (CPU) which is a general-purpose processor that executes software (program) to implement various functions. Further, the above-mentioned various processors also include a programmable logic device (PLD) which is a processor, such as a field programmable gate array (FPGA), whose circuit configuration can be changed after manufacturing. Furthermore, the above-mentioned various processors also include a dedicated electric circuit which is a processor, such as an application specific integrated circuit (ASIC), having a circuit configuration designed specifically for executing specific processing.

The function of each unit may be implemented by one processor, or may be implemented by combining a plurality of processors. Further, a plurality of functions may be implemented by one processor. In an example in which a plurality of functions are configured by one processor, first, as represented by a computer such as a client or a server, one processor is configured by a combination of one or more CPUs and software, and this processor is implemented as a plurality of functions. Second, as represented by a system-on-chip (SoC), there is a form in which a processor that implements the functions of the whole system by one integrated circuit (IC) chip is used. As described above, various functions are configured using one or more of the above-mentioned various processors as a hardware structure. Further, the hardware structure of these various processors is more specifically an electric circuit (circuitry) in which circuit elements such as semiconductor elements are combined.

In a case where the processor or the electric circuit executes the software (program), the processor (computer) readable code of the software to be executed is stored in a non-transitory recording medium such as a read only memory (ROM), and the processor refers to the software. The software stored in the non-transitory recording medium includes a program for executing image input and subject measurement. The code may be recorded on a non-temporary recording medium such as a magneto-optical recording device or a semiconductor memory instead of the ROM. In a case of processing using software, for example, a random access memory (RAM) is used as a temporary storage region. For example, it may be possible to refer to data stored in an electronically erasable and programmable read only memory (EEPROM) which is not shown.

<Configuration of Storage Unit>

The storage unit 200 is composed of a non-temporary recording medium such as a magneto-optical disk and a semiconductor memory and a control unit thereof, and stores an input image, a measurement result, and the like in an associated manner.

<Configuration of Display Unit and Operation Unit>

The display' unit 300 comprises a monitor 310 (display device), and is able to display input images, images and information stored in the storage unit 200, results of processing performed by the processing unit 100, and the like. The operation unit 400 includes a keyboard 410 and a mouse 420 as an input device and/or a pointing device, and a user is able to perform an operation necessary for measurement of a subject through these devices and a screen of the monitor 310.

<Example of Transmission Wavelength Shift (Case 1)>

An example of the transmission wavelength shift in the imaging apparatus 20 having the above-mentioned configuration will be described with reference to a comparative example.

<Configuration of Example>

In this example, the first optical filter 53A and the second optical filter 53B respectively transmit light of two wavelengths that does not overlap in the visible red wavelength band. Specifically, wavelength bands that do not overlap each other in the wavelength band of 650 nm to 740 nm are defined as a first wavelength band (transmission wavelength of the first optical filter 53A at the time of vertical incidence: 670 nm) and a second wavelength band (the transmission wavelength of the second optical filter 53A at the time of vertical incidence: 710 nm). FIGS. 6A and 6B are diagrams showing how rays are incident into the optical filter 53. FIG. 6A shows the incidence of the high image height rays (image height of 70%) and the central rays into the first optical filter 53A, and FIG. 6B shows the incidence of the high image height rays (image height of 70%) and the central rays into the second optical filter 53B. In FIGS. 6A and 6B, the thickness is highlighted to clearly show the arrangement of the optical filter 53.

The refractive index of the flat plate 54 (substrate) in the example is 1.5, and the effective refractive indices of the first optical filter 53A and the second optical filter 53B are 1.83 and 2.04, respectively.

<Configuration of Comparative Example>

In the comparative example, the imaging optical system 60 is a double Gaussian optical system, and is composed of a first optical system 61 and a second optical system 62 as shown in FIGS. 7A and 7B. The optical filter 63 is disposed at the position of the entrance pupil of the imaging optical system 60, and is composed of a first optical filter 63A disposed in a circular region centered on the optical axis AX2 and a second optical filter 63B disposed outside the first optical filter 63A. Further, in a similar manner to the example, each light-receiving element of the imaging apparatus (not shown) corresponding to the imaging optical system 60 is provided with a light blocking mask (not shown) having a different shape of light blocking corresponding to the arrangement of the first optical filter 63A and the second optical filter 63B.

Also in the comparative example, in a similar manner to the example, the first optical filter 63A transmits light having a wavelength of 670 nm, and the second optical filter 63B transmits light having a wavelength of 710 nm. FIG. 7A shows the incidence of the high image height rays (image height of 70%) and the central rays into the first optical filter 63A, and FIG. 7B shows the incidence of the high image height rays (image height of 70%) and the central rays into the second optical filter 63B. In FIGS. 7A and 7B, the thickness is highlighted to clearly show the arrangement of the optical filter 63.

Also in the comparative example, the refractive index of the substrate on which the optical filter 63 is disposed is 1.5, and the effective refractive indices of the first optical filter 63A and the second optical filter 63B are 1.83 and 2.04, respectively.

<Transmission Angle and Transmission Wavelength of Ray in Examples and Comparative Examples>

Figure 9A:
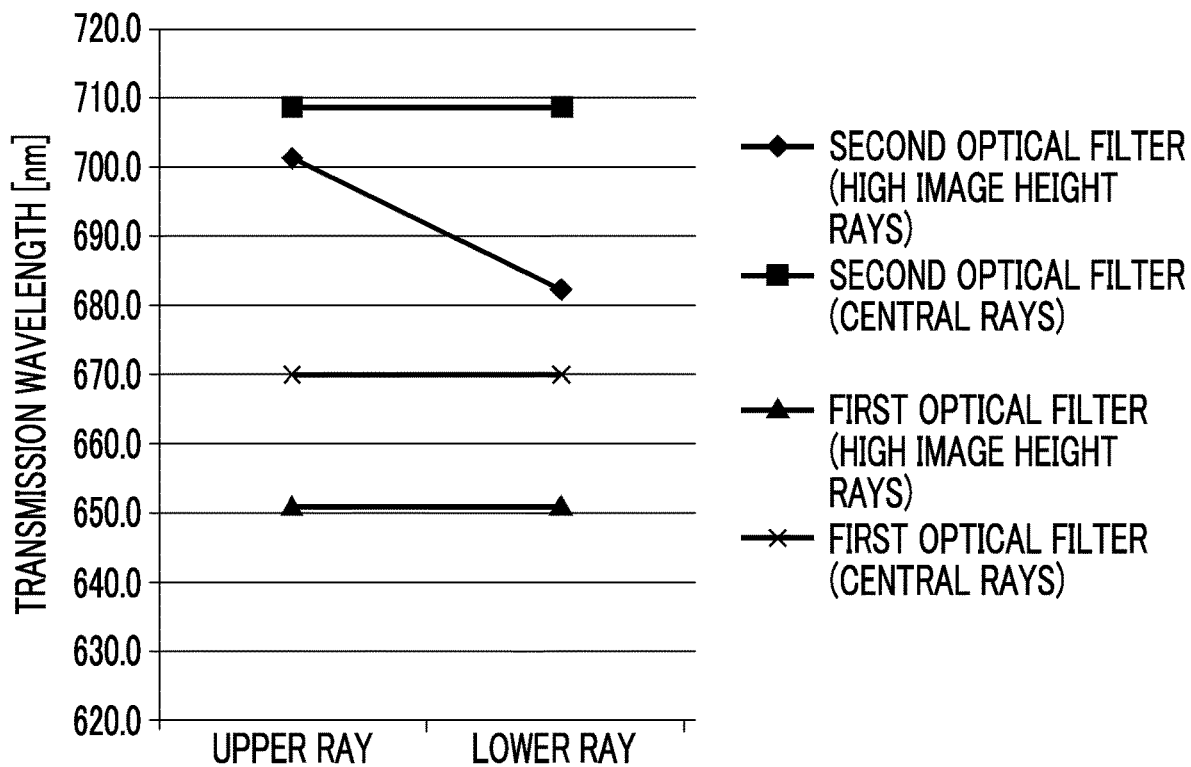
FIGS. 9A and 9B are graphs showing transmission wavelengths in the example and the comparative example.
Figure 9B:
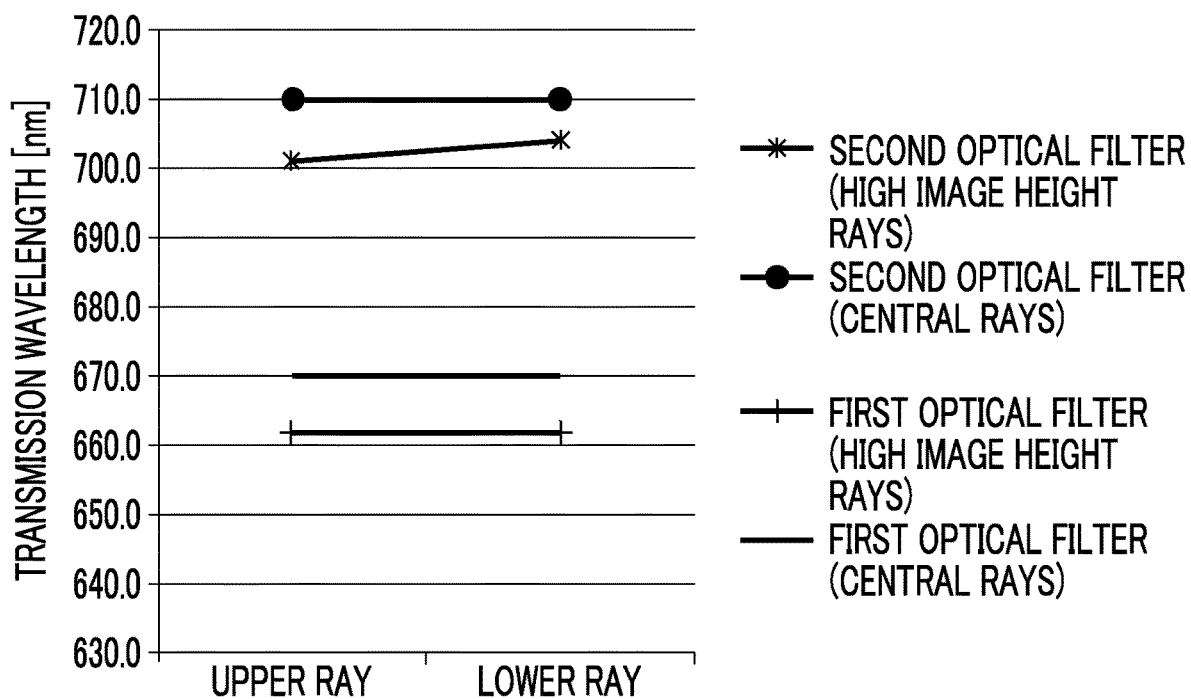

In the examples and comparative examples of the above-mentioned configuration, FIG. 8A shows the incident angle to the optical filter, and FIG. 8B shows the transmission wavelength of the optical filter. Further, FIG. 9A is a graph of the transmission wavelength in the comparative example, and FIG. 9B is a graph of the transmission wavelength in the example. FIG. 10 schematically shows a graph of the transmission wavelength shown in FIGS. 9A and 9B.

Assuming that the transmission center wavelength at vertical incidence is $\lambda 0$, the refractive index of the substrate is Ne, and the effective refractive index of the optical filter is N*, the transmission wavelength $\lambda \theta$ of the optical filter (the transmission center wavelength at the incident angle $\theta$) is represented by Expression (1).

$$\lambda_\theta = \lambda_0 \times [1 - (Ne/N^*)^2 \times \sin^2\theta]^{1/2} \quad (1)$$

<Evaluation of Comparative Example>

As can be seen from FIGS. 8A, 8B, 9A, and 9B, in the comparative example, the difference in transmission angle between the upper ray and the lower ray of the high image height rays transmitted through the second optical filter 63B is 9.8 deg (=22.1 deg-12.3 deg). Thereby, the difference in transmission wavelength becomes 18.9 nm. Therefore, the acquired image is composed of transmitted light in a wide wavelength band at a peripheral portion of the screen (a position of which the image height is high), and is not suitable for measurement using a narrow band wavelength. Further, in the comparative example, the difference in transmission angle between the high image height rays and the central rays transmitted through the first optical filter 63A is as large as 16.8 deg, and the obtained image is an image composed of transmission wavelengths (difference in transmission wavelength is 19.1 nm) greatly different between the periphery and the center. Therefore, the comparative example is not suitable for measurement using a specific wavelength.

<Evaluation of Example>

In contrast to the comparative example described above, in the example, the difference in transmission angle between the upper ray and the lower ray of the high image height rays passing through the second optical filter 53B is 1.58 deg (the rays are substantially parallel). Thereby, the difference in transmission wavelength is as small as 2.1 nm. Therefore, this example is suitable for measurement using a narrow band wavelength. The reason why the difference in transmission wavelength is small is that the first optical system 51, which is an afocal optical system, causes the high image height rays and the central rays to be incident into the second optical filter 53B in a substantially parallel state.

In this example, the difference in transmission angle between the high image height rays and the central rays passing through the first optical filter 53A is 11.04 deg, which is smaller than that in the comparative example, and the obtained image has a small difference in transmission wavelength (8.2 nm) between the periphery and the center. Therefore, this example is suitable for measurement using a wavelength in a narrow band (for example, 10 nm or less). The reason why the difference in transmission wavelength is small is that the first optical system 51, which is an afocal optical system, causes the high image height rays and the central rays to be incident into not only the second optical filter 53B but also the first optical filter 53A in a substantially parallel state.

<Threshold Value for Incident Angle>

According to the results of the example, in order to suppress the shift of the transmission wavelength and acquire an image suitable for the narrow band wavelength, the difference in angle formed between the upper ray of the high image height rays and the lower ray of the high image height rays incident into the second optical filter 53B is preferably equal to or less than 5 deg (equal to or less than a first threshold value), and more preferably equal to or less than 2 deg. Further, the difference in angle formed between the lower ray of the high image height rays incident into the second optical filter 53B and the lower ray of the central rays is preferably equal to or less than 15 deg (equal to or less than a second threshold value), and is more preferably equal to or less than 10 deg.

Further, the difference in angle formed between the upper ray of the high image height rays incident into the first optical filter 53A and the upper ray of the central rays is preferably equal to or less than 15 deg (equal to or less than a third threshold value). In a similar manner, the difference in angle formed between the lower ray of the high image height rays incident into the first optical filter 53A and the lower ray of the central rays is preferably equal to or less than 15 deg (equal to or less than a fourth threshold value).

The above-mentioned first to fourth threshold values can be set such that the difference in transmission wavelength between the rays is equal to or less than a threshold value (for example, 10 nm, 5 nm, or the like).

<Example of Transmission Wavelength Shift (Case 2)>

The above-mentioned example has described the case where the first optical filter 53A and the second optical filter 53B respectively transmit light having wavelengths of 610 nm and 710 nm (red in the visible region). However, optical filters, which transmit light having wavelengths different therefrom, may be used. For example, a first optical filter disposed in a circular region centered on the optical axis may transmit light of 1696 nm, and a second optical filter disposed in an annular region around the first optical filter may transmit light of 1426 nm. FIG. 11 shows the transmission wavelength in a case where the optical filter having such arrangement is used (the incident angle is the same as that of FIG. 5A), FIGS. 12A and 12B are graphs of the tables shown in FIG. 11.

Figure 12A:
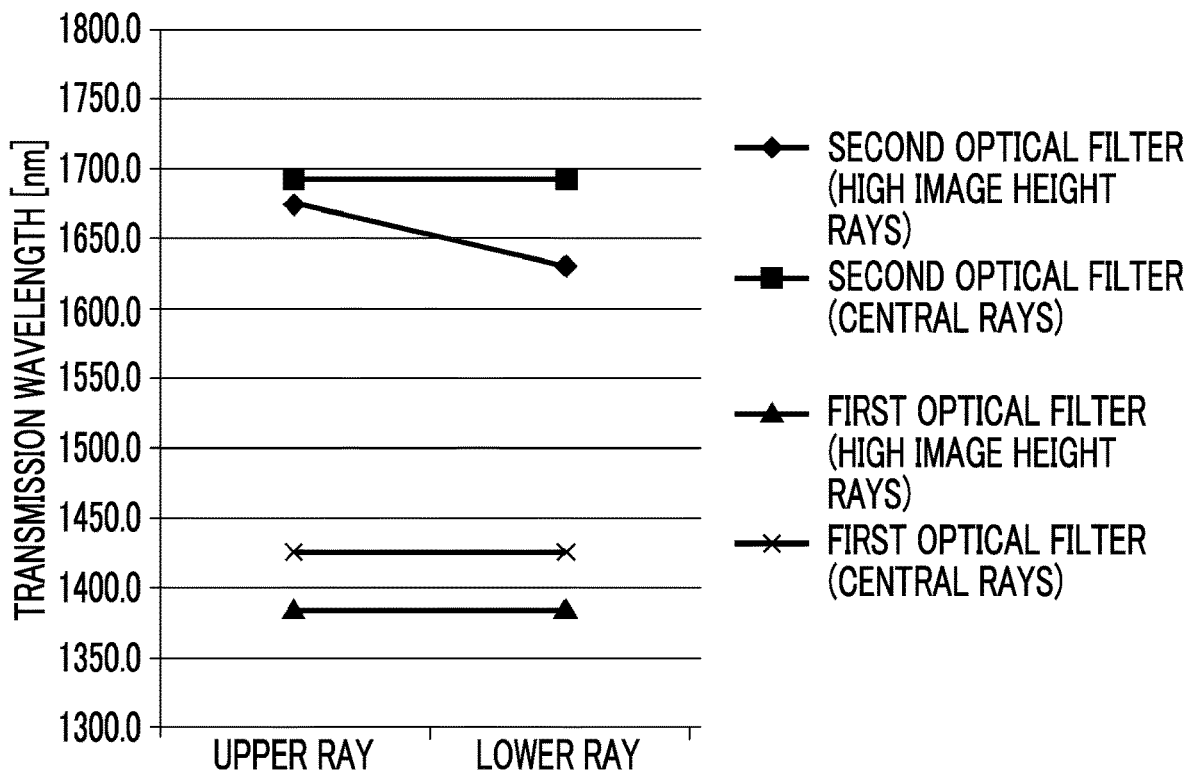
FIGS. 12A and 12B are separate graphs showing transmission wavelengths in the example and the comparative example.
Figure 12B:
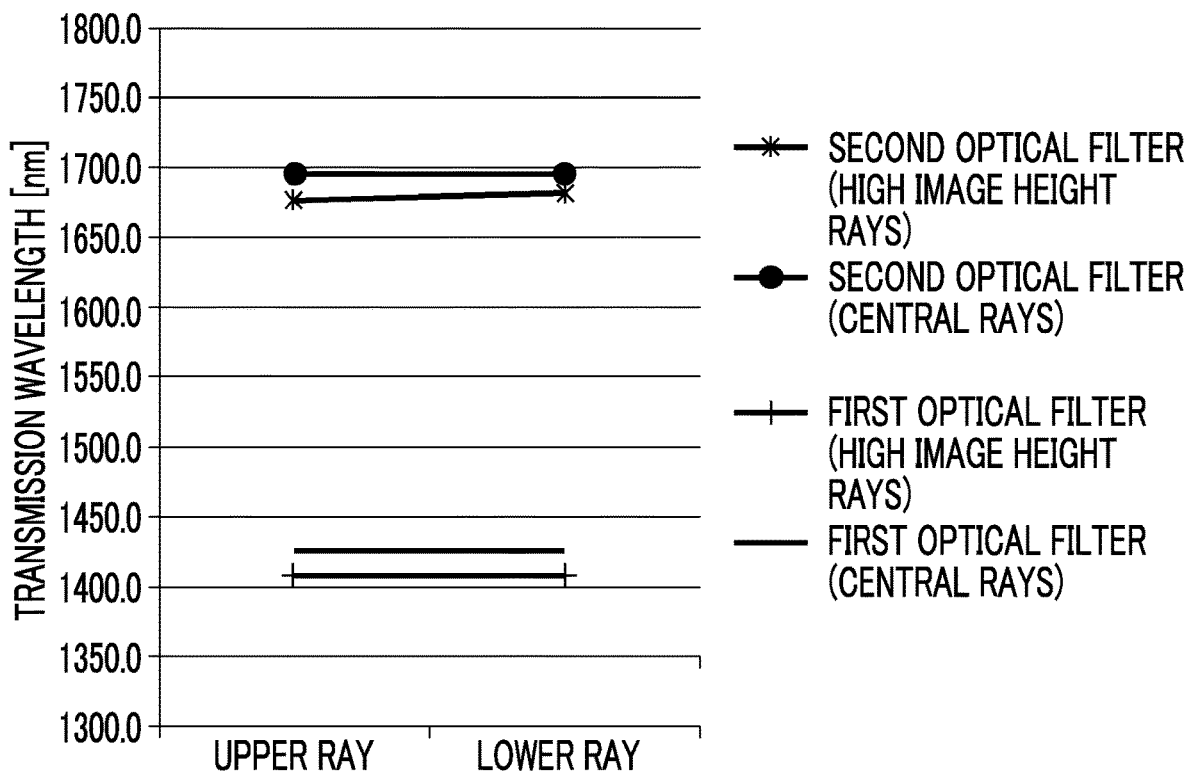

As can be seen from FIGS. 11, 12A, and 12B, in the example, the difference in transmission wavelength is smaller than that in the comparative example, and an image suitable for measurement using a narrow band wavelength and a specific wavelength can be obtained. For example, in the comparative example, a difference in transmission wavelength of the second optical filter (peripheral annular filter) for high image height rays between the upper ray and the lower ray is 45.3 nm, but in the example, the difference is 4.9 nm. Further, in the comparative example, a difference in transmission wavelength between the lower ray of the high image height rays and the lower ray of the central rays with respect to the second optical filter is 62.5 nm, but in the example, the difference is 15.0 nm. It should be noted that, in Case 2, the lens configuration and arrangement of the optical system are the same as those in Case 1 described above, and the optical filter is disposed at the position of the entrance pupil of the optical system.

The incident angle to the optical filter in Case 2 is the same as that in Case 1. However, since the transmission wavelength of the optical filter is different from that in Case 1, the amount of wavelength shift is different even in a case where the difference in incident angle is the same. Therefore, in Case 2, the threshold value of the incident angle may be changed from that in Case 1, or a threshold value for the wavelength shift may be set. For example, the threshold value of the difference in transmission wavelength between the upper ray and the lower ray of the high image height rays for the second optical filter is set to 10 nm (preferably 5 nm). The threshold value of the difference in transmission wavelength between the lower ray of the high image height rays and the lower ray of the central rays for the second optical filter can be set to 20 nm.

<Effects of First Embodiment>

As described above, in the imaging apparatus 20 according to the first embodiment, the first optical system 51, which is an afocal optical system, causes the high image height rays and the central rays to be incident into the second optical filter 53B in a substantially parallel state, and causes the high image height rays and the central rays to be incident into the first optical filter 53A in a substantially parallel state. Thereby, it is possible to suppress the difference in transmission angle and the wavelength shift, and it is possible to obtain an image suitable for measurement using a narrow band wavelength or measurement using a specific wavelength at a plurality of wavelengths.

<Other Examples of Arrangement of Optical Filter>

Figure 13A:
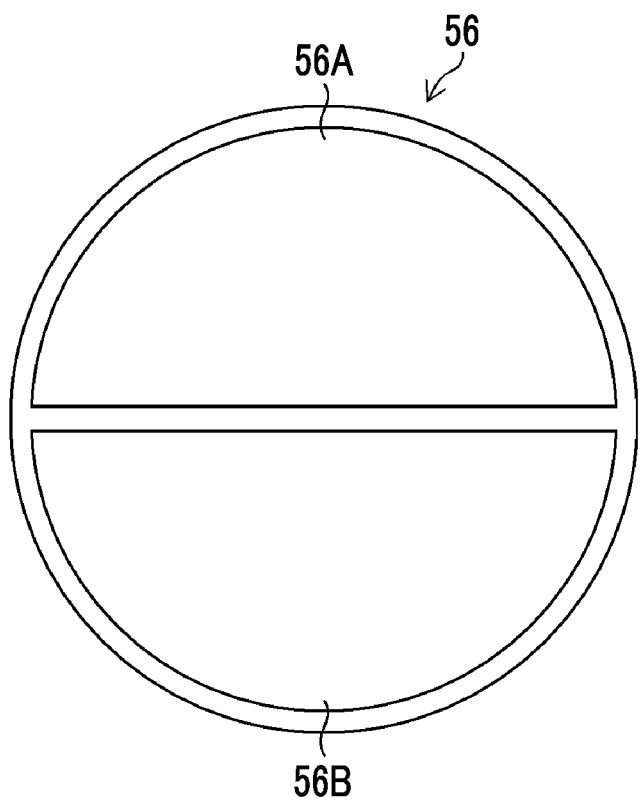
FIGS. 13A and 13B are diagrams showing modification examples of the arrangement of the optical filters.

In the imaging apparatus according to the present invention, as shown in FIG. 13A, an optical filter 56, in which the first optical filter 56A and the second optical filter 56B are separated in the vertical direction (may be separated in the horizontal direction or the diagonal direction) in a plane perpendicular to the optical axis and are arranged in different regions, may be used. In the case of the arrangement shown in FIG. 13A, the spread of each optical filter is halved in the dividing direction (vertical direction in the drawing), but each optical filter extends across the entire diameter in the direction orthogonal to the dividing direction (horizontal direction in the drawing). Therefore, in the optical system having the configuration as in the above-mentioned comparative example, variation in transmission wavelength due to the difference in angle between the rays incident from the horizontal direction in the drawing increases. However, in the optical system (imaging optical system 50) having the configuration as in the above-mentioned example, it is possible to suppress variation in transmission wavelength due to the difference in angle between the incident rays. The reason for this is that the first optical system 51 causes the high image height ray to be incident into the first optical filter 56A and the second optical filter 56B in a state where the upper ray and the lower ray are parallel.

Figure 13B:
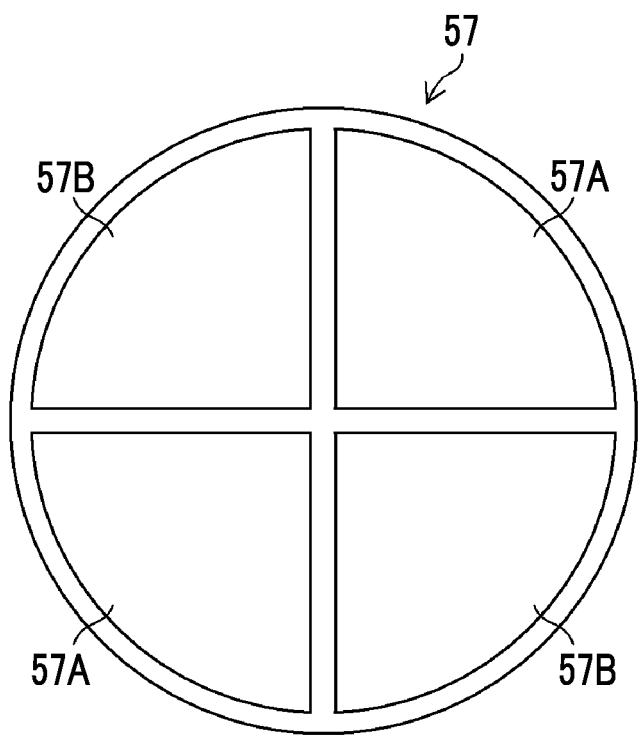

Further, in the imaging apparatus according to the present invention, as shown in FIG. 1313, the optical filter 57, in which the first optical filter 57A and the second optical filter 5713 are separated into fan-shaped regions facing each other in a plane perpendicular to the optical axis and are arranged in different regions, may be used. Even in such arrangement, in the optical system having the configuration as in the comparative example described above, variation in transmission wavelength due to the difference in angle between the incident rays increases. However, as in the arrangement shown in FIG. 13B, in the optical system (imaging optical system 50) having the same configuration as that in the above-mentioned example, it is possible to suppress variation in the transmission wavelength due to the difference in angle between the incident rays. Further, in the case of the arrangement shown in FIG. 1313, the balance in light amount can be achieved and the unevenness in light amount (shading) can be made less noticeable than that in the case of the arrangement shown in FIG. 13A.

It should be noted that the optical filters 56 and 57 described above are also arranged at the position of the entrance pupil of the imaging optical system 50, in a similar manner to the optical filter 53 in the first embodiment. Further, in a case where the optical filters 56 and 57 are used, a light blocking mask having arrangement corresponding to the arrangement of the optical filters is provided on the light receiving surface of the light-receiving element 162 so as to separate respective rays transmitted through the first and second optical filters and receive the rays.

The above-mentioned example has described the case where a single optical filter (optical filter 53, 56, or 57) is used. However, a plurality of optical filters having different transmission wavelength characteristics may be switched and used. For example, a plurality of optical filters may be provided on a rotating member such as a turret, and a desired filter may be inserted into the optical path (at the position of the entrance pupil) of the imaging optical system. Alternatively, a plurality of optical filters may be provided on the plate member, and the desired optical filter may be inserted into the optical path (position of the entrance pupil) of the imaging optical system by translating the plate member.

<Pupil Division by Micro Lens>

In the image processing apparatus 10 according to the first embodiment, the light blocking masks 162A and 162B functioning as pupil division units are provided on the light-receiving element 162. However, a micro lens array may be used as the pupil division unit. Specifically, one micro lens is provided for a plurality of (for example, two) light-receiving elements separated from each other, and each light-receiving element may receive light passing through a different pupil region (an optical filter having a different transmission wavelength).

<Measurement by Image Processing Apparatus>

In the image processing apparatus 10 according to the first embodiment, an image acquired by the imaging apparatus 20 can be input to the analysis device 30 (image input unit 110), and the measurement unit 120 is able to measure a subject. An example of such measurement will be described.

<Application to Water Quality Inspection>

In general, inspection of the water quality of oceans and lakes using remote sensing is performed by estimating the concentration of chlorophyll-a (Chl.a), dissolved organic matter (DOM), or suspended solids (SS) in water. As the dissolved organic matter, for example, a colored dissolved organic matter (CDOM) is used. The estimation of the concentration of these substances in water is performed by measuring the spectral reflectance on the surface of the water to be inspected. Depending on the substance whose concentration is to be estimated, the concentration of the estimated substance, and the place (open sea, coast, lake, or estuary) to be subjected to the water quality inspection, a wavelength band for measuring the optimal spectral reflectance changes. Hereinafter, a typical substance detected in a case of performing the water quality inspection and the wavelength band used for the detection will be described.

[Chlorophyll-a]

Chlorophyll-a is one of the representative substances whose concentration in water is estimated in the water quality inspection.

Figure 14:
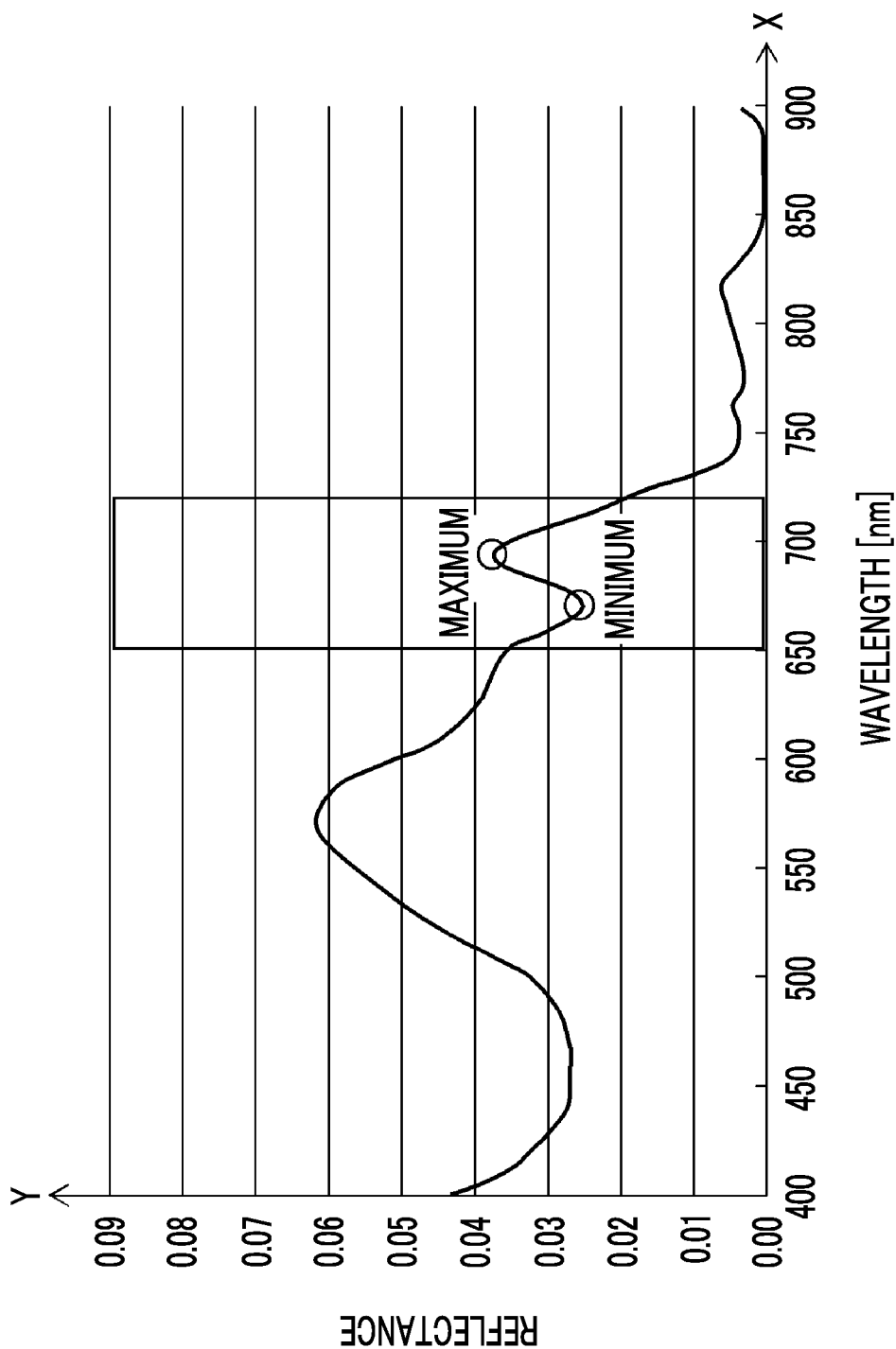
FIG. 14 is a diagram showing spectral reflectance of eutrophic water.

FIG. 14 is a diagram showing the spectral reflectance of typical eutrophic water. In the drawing, the X axis represents the wavelength and the Y axis represents the reflectance, and a graph of the spectral reflectance of typical eutrophic water is shown.

The characteristic of the spectral reflectance of typical eutrophic water has a maximum value at a wavelength around 570 nm. Further, the minimum at a wavelength of about 670 nm is caused by light absorption by chlorophyll-a. Particularly, in water quality inspection of eutrophic water in lake and coast, it is known that the ratio or difference between the minimum value and the maximum value of the reflectance at wavelengths from 650 nm to 720 nm has a high correlation with the concentration of chlorophyll-a in water. Therefore, the concentration of chlorophyll-a is estimated using the minimum value and the maximum value of the reflectance in this wavelength band. It is known that the maximum value shifts to the higher wavelength side as the concentration of chlorophyll-a increases. However, by changing the wavelength band in which the first optical filter and the second optical filter in the imaging apparatus 20 transmits light, it is possible to cope with this shift to the higher wavelength side.

Assuming that "Chia" is the concentration of chlorophyll-a and $R(\lambda)$ is the reflectance at wavelength $\lambda$, as a basic model for estimating chlorophyll-a, a model using a band ratio of two wavelengths represented by Expression (2) is known.

$$\text{Chl.a} \propto R(\lambda_i)/R(\lambda_j) \qquad (2)$$

It is known that the two wavelengths used in the above estimation model differ depending on the water region. Therefore, in the case of performing a water quality inspection on the basis of the concentration of chlorophyll-a by using the image processing apparatus 10, for example, an optical filter is used. In the optical filter, the first optical filter and the second optical filter described above respectively transmit light in the first wavelength band and light in the second wavelength band that do not overlap each other in a wavelength band of 650 nm or more and 740 nm or less. For example, as in the example of Case 1, an optical filter, which transmits light of 670 nm (first wavelength band), is used as the first optical filter, and an optical filter, which transmits light of 710 nm (second wavelength band) is used as the second optical filter. Thus, an image having a small wavelength shift can be acquired by the imaging apparatus 20 according to the first embodiment, and the concentration of chlorophyll-a can be accurately measured by the analysis device 30 (the measurement unit 120).

<Application to Soil Inspection>

In the measurement using two wavelengths, it is known to use a normalization index for extracting various properties of a target object. The normalization index is defined by $[R(\lambda 1)-R(\lambda 2)]/[R(\lambda 1)+R(\lambda 2)]$, where the reflectances at two wavelengths $\lambda 1$ and $\lambda 2$ is set as $R(\lambda 1)$ and $R(\lambda 2)$. For example, this expression can be applied to estimation of a soil moisture ratio (moisture weight included in a unit weight of dryness). A desirable approximation of a normalization index NDSMI (Normalized Difference Soil Moisture Index) defined by $[R(1696\ nm)-R(1426\ nm)]/[R(1696\ nm)+R(1426\ nm)]$ can be obtained in a case where the soil moisture ratio is in the range of 0% to 60%. That is, $\lambda 1=1696$ nm and $\lambda 2=1426$ nm. As described above for Case 2, an image with a small wavelength shift is acquired by the imaging apparatus 20 according to the first embodiment, and the analysis device 30 (the measurement unit 120) is able to accurately measure the soil moisture ratio.

<Other Measurement Examples>

In the image processing apparatus 10 (measurement unit 120) according to the present invention, an index other than the above-mentioned index can be calculated by using optical filters having different transmission wavelengths. For example, it is possible to detect human skin with $\lambda 1=1070$ nm and $\lambda 2=1550$ nm, and to detect oak withering with $\lambda 1=1460$ am and $\lambda 2=1280$ nm. Further, the measurement is not limited to the above-mentioned index, and another measurement can be performed, Although the embodiments of the present invention have been described above, the present invention is not limited to the above-mentioned aspects, and various modifications can be made without departing from the spirit of the present invention.

EXPLANATION OF REFERENCES

10: image processing apparatus
20: imaging apparatus
22: light receiving unit
22A: imaging surface
24: image acquisition unit
26: image recording unit
30: analysis device
50: imaging optical system
51: first optical system
52: second optical system 53: optical filter
53A: first optical filter
53B: second optical filter
54: flat plate
56: optical filter
56A: first optical filter
56B: second optical filter
57: optical filter
57A: first optical filter
57B: second optical filter
60: imaging optical system
61: first optical System
62: second optical system
63: optical filter
63A: first optical filter
63B: second optical filter
100: processing unit
110: image input unit
120: measurement unit
122A: ray
122B: ray
152: micro lens
162: light-receiving element
162A: light blocking mask
162B: light blocking mask
200: storage unit
300: display unit
310: monitor
400: operation unit
410: keyboard
420: mouse
AX1: optical axis
AX2: optical axis
L1: lens
L2: lens
L3: lens
L4: lens
L5: lens
L6: lens
L7: lens
L8: lens
i1: image
i2: image

What is claimed is:

1. An imaging apparatus comprising:
an imaging optical system in which a first optical system, an optical filter composed of a first optical filter and a second optical filter, where the first optical filter transmits light in a first wavelength band and the second optical filter transmits light in a second wavelength band different from the first wavelength band, and a second optical system are arranged in order from the subject side;
a directional sensor that has a plurality of pixels composed of two-dimensionally arranged photoelectric conversion elements, where the directional sensor pupil-divides each of rays incident through the optical filter and receives the rays selectively; and
an image sensor that acquires, from the directional sensor, each of a first image received through the first optical filter and a second image received through the second optical filter,
wherein the first optical filter and the second optical filter are arranged in different regions in a plane perpendicular to an optical axis of the imaging optical system at a position of an entrance pupil of the imaging optical system, respectively, and
wherein the first optical system causes high image height rays imaged at a position at which an image height is high on an imaging surface of the directional sensor to be incident into the first optical filter and the second optical filter in a state where an upper ray and a lower ray of the high image height rays are parallel.

2. The imaging apparatus according to claim 1,
wherein the first optical filter is disposed in a first region centered on the optical axis,
wherein the second optical filter is disposed in a second region outside the first region, and
wherein the first optical system causes the high image height rays to be incident into the second optical filter in a state where the upper ray and the lower ray of the high image height rays are parallel.

3. The imaging apparatus according to claim 2, wherein the first optical system causes the high image height rays and central rays imaged at a center of the imaging surface to be incident into the second optical filter in a state where an angle formed between the upper ray of the high image height rays and the lower ray of the high image height rays is equal to or less than a first threshold value and an angle formed between the lower ray of the high image height rays and a lower ray of the central rays is equal to or less than a second threshold value.

4. The imaging apparatus according to claim 2, wherein the first optical system causes the high image height rays and central rays imaged at a center of the imaging surface to be incident into the first optical filter in a state where an angle formed between the upper ray of the high image height rays and an upper ray of the central rays is equal to or less than a third threshold value and an angle formed between the lower ray of the high image height rays and a lower ray of the central rays is equal to or less than a fourth threshold value.

5. The imaging apparatus according to claim 1, wherein the first optical system constitutes an afocal optical system.

6. The imaging apparatus according to claim 5, wherein an afocal magnification of the afocal optical system is less than 1.

7. The imaging apparatus according to claim 1, wherein the directional sensor has a light blocking mask or a micro lens array that functions as a pupil division unit.

8. The imaging apparatus according to claim 1, wherein the first optical filter and the second optical filter transmit light having wavelength bands, which do not overlap each other in a wavelength band of 650 nm or more and 740 nm or less, as light having the first wavelength band and light having the second wavelength band, respectively.

9. An image processing apparatus comprising:
the imaging apparatus according to claim 1; and
a processor that measures a subject from the first image and the second image.

* * * * *